(12) United States Patent
Van Dijck (10) Patent No.: US 12,465,883 B2
(45) Date of Patent: Nov. 11, 2025

(54) DEVICE AND METHOD FOR THE ADSORPTION OF A GAS FROM A GAS MIXTURE TO BE TREATED

(71) Applicant: ATLAS COPCO AIRPOWER, NAAMLOZE VENNOOTSCHAP, Wilrijk (BE)

(72) Inventor: Wouter Denis Ann Van Dijck, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 539 days.

(21) Appl. No.: 17/916,451

(22) PCT Filed: Mar. 29, 2021

(86) PCT No.: PCT/IB2021/052575
§ 371 (c)(1),
(2) Date: Sep. 30, 2022

(87) PCT Pub. No.: WO2021/229314
PCT Pub. Date: Nov. 18, 2021

(65) Prior Publication Data
US 2023/0142828 A1  May 11, 2023

(30) Foreign Application Priority Data

May 13, 2020  (BE) .................................. 2020/5333

(51) Int. Cl.
*B01D 53/02* (2006.01)
*B01D 53/047* (2006.01)
*B01D 53/26* (2006.01)

(52) U.S. Cl.
CPC ......... *B01D 53/047* (2013.01); *B01D 53/261* (2013.01); *B01D 2257/80* (2013.01);
(Continued)

(58) Field of Classification Search
CPC ...... B01D 2257/80; B01D 2259/40003; B01D 2259/402; B01D 2259/403; B01D 53/047; B01D 53/261
See application file for complete search history.

(56) References Cited

U.S. PATENT DOCUMENTS 4,305,734 A * 12/1981 McGill .................. B01D 53/04
95/143
6,071,321 A * 6/2000 Trapp .................... B01D 53/261
55/318
(Continued)

FOREIGN PATENT DOCUMENTS

JP   1988-069529 U   5/1988
WO   2016179668 A1   11/2016

OTHER PUBLICATIONS

OA received in corresponding JP Application No. 2022-567107 dated Dec. 11, 2023 with Translation.
(Continued)

*Primary Examiner* — Christopher P Jones
(74) *Attorney, Agent, or Firm* — BACON&THOMAS, PLLC (57) ABSTRACT

Device for adsorbing a gas from a gas mixture to be treated, having an inlet for gas to be treated and an outlet for treated gas, including at least two vessels filled with a regenerable adsorbent and an adjustable valve system connecting the inlet and outlet to the vessels, whereby the adjustable valve system is such that at least one vessel will treat compressed gas while the other vessel is regenerated, whereby by adjusting the valve system the vessels each in turn treat compressed gas sequentially, and the adjustable valve system is assembled in a single valve block.

20 Claims, 7 Drawing Sheets

(52) U.S. Cl.
CPC .............. *B01D 2259/40003* (2013.01); *B01D 2259/402* (2013.01); *B01D 2259/403* (2013.01)

(56) References Cited

U.S. PATENT DOCUMENTS

| | | | | |
|---|---|---|---|---|
| 7,097,696 B2* | 8/2006 | Salzman | ............... | B01D 53/261 96/139 |
| 7,635,409 B2* | 12/2009 | Mahoney | ............. | B01D 53/261 96/147 |
| 8,999,045 B2* | 4/2015 | Ericson | ................ | B01D 53/261 96/144 |
| 9,950,291 B1 | 4/2018 | Wright | | |
| 2005/0188848 A1 | 9/2005 | Salzman et al. | | |
| 2014/0013956 A1 | 1/2014 | Ericson et al. | | |
| 2014/0245890 A1* | 9/2014 | Walker | ............... | B01D 53/0407 96/133 |

OTHER PUBLICATIONS

International Search Report and Written Opinion in corresponding PCT Application No. PCT/IB2021/052575, dated May 31, 2021.
BE Search Report in corresponding BE Application No. 202005333, dated Feb. 9, 2021.
International Preliminary Report on Patentability in corresponding PCT Application No. PCT/IB2021/052575, dated May 12, 2022.

* cited by examiner

DEVICE AND METHOD FOR THE ADSORPTION OF A GAS FROM A GAS MIXTURE TO BE TREATED

FIELD OF THE INVENTION

The present invention relates to a device for the adsorption of a gas from a gas mixture to be treated.

This gas may be compressed gas from a compressor installation, for example.

The gas that is adsorbed may also be water vapor, for example, so the device is essentially a dryer.

BACKGROUND OF THE INVENTION

More specifically, the invention relates to a device for the adsorption of a gas from a gas mixture to be treated that is provided with an inlet for gas to be dried and an outlet for dried gas, whereby the dryer includes at least two vessels filled with a regenerable adsorbent and an adjustable valve system connecting the aforementioned inlet and outlet to the aforementioned vessels, whereby the adjustable valve system is regulated as such that at least one vessel will treat compressed gas, while the other vessel is successively regenerated and cooled, whereby, by adjusting the valve system, the vessels will each in turn treat compressed gas.

Regenerable adsorbent means an adsorbent or desiccant that can adsorb gas from a gas mixture by adsorption and, when saturated with gas, can be regenerated by transmitting a so-called regeneration gas through it. The regeneration gas in this case is, for example, a high-pressure gas that is expanded through a nozzle, expansion valve, or the like.

When a vessel treats a gas mixture, it will adsorb a gas from the gas mixture to be treated, saturating the drying agent.

This vessel is then regenerated, typically by passing dried compressed air through it, which is expanded via a nozzle, expansion valve, or the like. This gas will extract the adsorbed gas from the adsorbent and thus regenerate it.

The vessel can then be cooled before being used again to treat compressed gas.

Such types of devices are already known, where the adjustable valve system is used to switch the vessels between treatment and regeneration/cooling.

Because of the geometry of the device in general and of the vessels in particular, it is obvious to implement the adjustable valve system in two so-called valve blocks, one of which connects the aforementioned inlet and the second of which connects the aforementioned outlet to the aforementioned vessels.

Hereby, one valve block is fitted at the bottom of the vessels and one valve block is fitted on top of the vessels.

Such well-known devices with an adjustable valve system with two separate valve blocks to enabling switching of the vessels, have the advantage that they are relatively compact because all kinds of channels, conduits, and valves are grouped in the two valve blocks.

For small devices, i.e. with a drying agent volume of around 10 liters, such a valve system still takes up a lot of space compared to the effective drying agent.

Moreover, for small devices it is even more important that they are very compact, since in most cases they are used for applications where there is not much space or where one does not want to spend a lot of space on the dryer.

But also for other, larger devices it is advantageous to design the valve system as small as possible, as this is associated with lower material costs and lower weight.

US 2014/013956 A1 discloses a device for the adsorption of a gas from a gas mixture.

US 2005/188848 A1 discloses a device for the adsorption of a gas from a gas mixture.

SUMMARY OF THE INVENTION

The aim of the present invention is to provide a device with a very compact valve system.

To this aim, the invention concerns a device for the adsorption of a gas from a gas mixture, with an inlet for a gas mixture to be treated and an outlet for treated gas, which device comprises at least two vessels filled with a regenerable adsorbent and an adjustable valve system connecting the aforementioned inlet and outlet to the aforementioned vessels, whereby the adjustable valve system is regulated such that at least one vessel will treat compressed gas, while the other vessel is successively regenerated and cooled, whereby, by regulation of the valve system, the vessels will each in turn treat compressed gas, characterized in that the adjustable valve system is combined into a single valve block.

The term 'vessel' should be interpreted broadly here. The vessel in itself need not be a separate component of the device but may also be realized as a cavity in an enclosure, whereby this cavity contains the desiccant, in the form of what will be called desiccant core.

An advantage is that by bringing the adjustable valve system together in a single valve block, it can be made very compact.

Furthermore, less material is needed to manufacture the valve block and the amount of electrical and/or pneumatic piping can be greatly reduced too because, unlike in the known dryers with each valve block equipped with the necessary valves, now valves can be combined.

This has the added advantage of making the device cheaper and lighter.

In the most preferred embodiment, the vessels are provided with two gas accesses, which are located adjacent to each other or at the same end of the vessel and which are arranged in such a way that gas entering the vessel through one access can only leave the vessel through the other access after passing through the adsorbent.

This has the advantage that the aforementioned accesses are on the same side or end of the vessel, so the valve block can be placed on this side or end of the vessel.

Indeed, by placing the accesses next to each other, the adjustable valve system can be executed as a single valve block.

In order to ensure that gas that enters the vessel through one access can only leave the vessel through the other access after passing through the adsorbent, several measures can be taken.

Preferably, this is achieved by connecting to one of the aforementioned passages a conduit, tube, or the like extending into the vessel and through the adsorbent.

Thus, to exit the vessel through this access with tube, the gas must pass through the adsorbent (or a part thereof) or, conversely, after the gas has entered through this passage with tube, it will first have to pass through the adsorbent (or a part thereof) to exit the vessel through the other access.

It is also possible that this will be achieved by other means. For example, if the vessels are realized by a cavity in the housing of the device, one can place in this cavity a bulkhead or the like with an access on each side of the bulkhead.

In a practical embodiment, this is the valve block provided with:
  one or more control valves;
  a supply channel running from the inlet to the aforementioned control valves;
  an outlet channel running from the vessels to the outlet;
  a blow-off channel leading from the aforementioned control valves to a blow-off opening;
  a regeneration channel which runs from the outlet channel to the vessels.

Due to the design or layout of the valve block, in most cases it is the case that the aforementioned channels (or a part thereof) coincide, or that after switching the vessels, two channels switch their function, for example.

Preferably, the control valves comprise either two 3/2 valves or one 5/2 valve. Of course, the invention is not limited to this.

The invention also relates to a method for adsorbing a gas from a gas mixture to be treated, using a device having an inlet for gas to be treated and an outlet for treated gas, which device comprises at least two vessels filled with a regenerable adsorbent, using an adjustable valve system connecting said inlet and outlet to said vessels, whereby the method includes the step of arranging the adjustable valve system such that at least one vessel will treat compressed gas while the other vessel is regenerated, the vessels each successively treating compressed gas in turn, characterized in that the method includes the step of combining the adjustable valve system into a single valve block.

In the most preferred variant, the method further comprises the following steps:
  providing both vessels with two accesses located side by side or at the same end of the vessel,
  passing the gas through the vessels in such a way that the gas enters the vessel through one access and can only leave the vessel through the other access after passing through the adsorbent.

In a practical embodiment, the method includes the step of connecting a conduit, tube, or the like to one of the aforementioned passages extending into the vessel and through the drying agent.

Preferably, the method includes the step of switching the vessels every ten to thirty seconds between adsorption and regeneration.

It should be understood that the method according to the invention has the same advantages as the device according to the invention for adsorbing a gas from a gas mixture to be treated.

BRIEF DESCRIPTION OF THE DRAWINGS

To better demonstrate the characteristics of the invention, the following describes, by way of example without any restrictive character, a number of preferred embodiments of a device and method for the adsorption of a gas from a gas mixture to be treated in accordance with the invention, with reference to the accompanying drawings, in which.

DETAILED DESCRIPTION OF THE INVENTION

Figure 1:
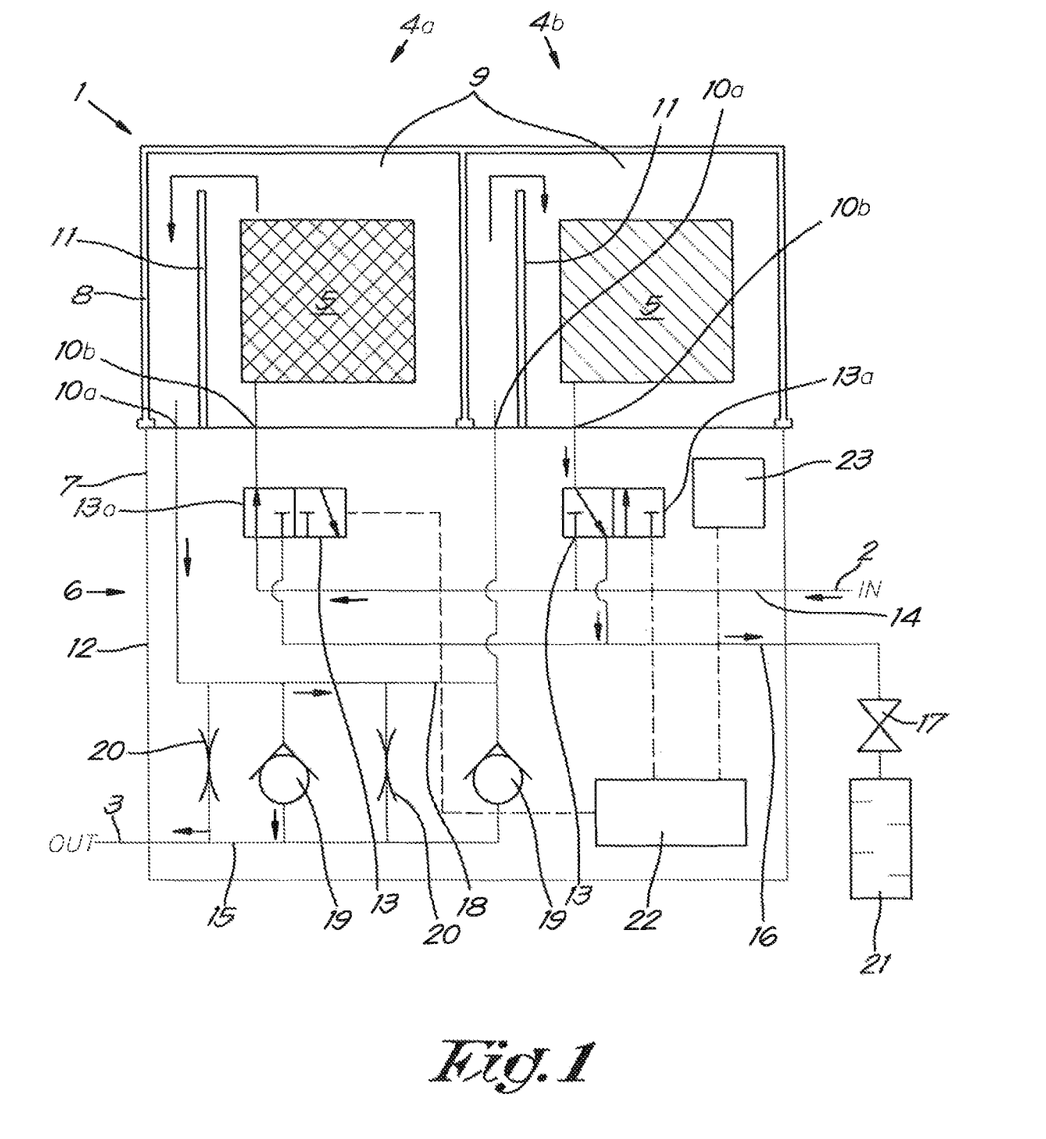
FIG. 1 schematically shows an arrangement in accordance with the invention.

The device according to the invention for adsorbing a gas from a gas mixture to be treated, shown schematically in FIG. 1, will, in this case, adsorb water vapor from a gas.

In other words, the device is a dryer 1.

The dryer 1 according to the invention mainly comprises an inlet 2 for gas to be dried, an outlet 3 for dried gas, two vessels 4a, 4b with a regenerable adsorbent 5 and an adjustable valve system 6.

Since this is a dryer 1, in what follows, the adsorbent 5 will also be called drying agent 5.

In this case, the vessels 4a, 4b are realized in the housing 7 of the dryer 1, more particularly by means of a casting 8 specially provided for this purpose, which is attached to the rest of the housing 7 of the dryer 1.

In this casting 8, two cavities 9 or spaces are provided in which the regenerable drying agent 5 or desiccant is introduced.

By attaching the casting 8 to the rest of the housing 7, the vessels 4a, 4b are created which are separated from each other. This means that gas cannot flow from one vessel 4a to the other vessel 4b.

Each vessel, 4a, 4b, is provided with two accesses, 10a, 10b, for gas, which are located adjacent to each other or at the same end of the vessel 4a, 4b, in the illustrated example.

The design is such that gas entering the vessel 4a, 4b through one access 10a can only leave the vessel 4a, 4b through the other access 10b after passing through the drying agent 5.

To this end, bulkheads 11 or partitions are provided in the vessels 4a, 4b between both accesses 10a, 10b.

As can be seen from the figure, the gas entering the vessel 4a, 4b through one access 10a must always flow through the drying agent 5 before the gas can leave the vessel 4a, 4b through the other access 10b.

Although in the example shown drying agent 5 is only present on one side of the bulkhead 11, it is not ruled out that drying agent 5 is present on both sides of the bulkhead 11, i.e. the aforementioned cavities 9 or spaces are completely filled with drying agent 5.

The drying agent 5 contained in the vessels 4a, 4b is, in this case, a ceramic drying agent 5. Of course, the invention is not limited to this.

The adsorbent 5 or drying agent 5 preferably has a solid form, whereby it comprises a solid support made of ceramic material, paper, fiberglass or wire mesh.

The drying agent 5 further takes the form of granules held together in sieves or grilles not shown in the figures. This has the advantage that the drying agent 5 is, as it were, fixed in the vessels 4a, 4b and that the orientation of the dryer 1 plays no role in principle.

According to the invention, the adjustable valve system 6 comprises one and only one valve block 12.

By means of this valve block 12, the aforementioned inlet 2 and outlet 3 will be connected to the vessels 4a, 4b.

As is known, the adjustable valve system 6 is such that one vessel 4a will dry compressed gas, while the other vessel 4b is successively regenerated and cooled, whereby by adjusting the valve system 6, the vessels 4a, 4b each in turn successively dry compressed gas.

The valve block 12 in the example shown is provided with:
  one or more control valves 13;
  a supply channel 14 that runs from the inlet 2 to the aforementioned control valves 13;

an outlet channel 15 running from the vessels 4a, 4b to the outlet 3;

a blow-off channel 16 extending from the aforementioned control valves 13 to a blow-off opening 17;

a regeneration channel 18 which runs from the outlet channel 15 to the vessels 4a, 4b.

A portion of some of these channels 14, 15, 16, and 18 coincide or switch functions, primarily a result of the switching of vessels 4a, 4b between the drying and regeneration phases.

In the illustrated example, the valve block 12 is provided with two check valves 19 in the outlet channel 15.

A check valve 19 is provided for each vessel 4a, 4b. Of course, this need not necessarily be a check valve 19, but the vessels 4a, 4b may be provided with another type of outlet valve.

Further, the valve block 12 includes as control valves 13 two 3/2 valves 13a, which will control the switching of the vessels 4a, 4b.

Figure 2:
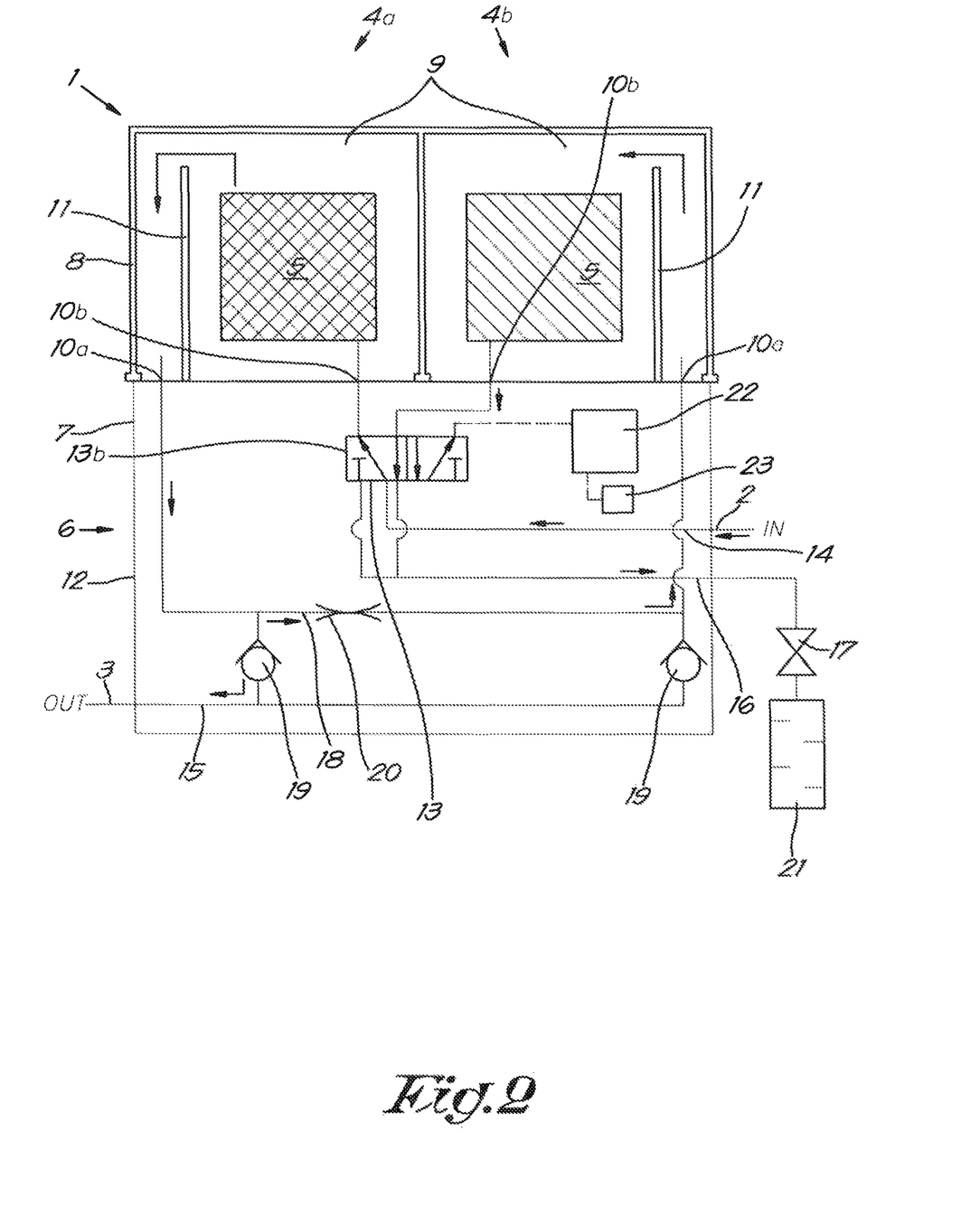
FIG. 2 shows an alternative of FIG. 1.

It is also possible to use one 5/2 valve 13b instead of two 3/2 valves 13a. This is shown in FIG. 2. The embodiment of FIG. 2 is otherwise identical to that of FIG. 1.

Further, the regeneration channel 18 in this case includes a throttling valve 20 to control the amount of gas passing through it.

In FIG. 1, two choke valves 20 are provided, which is more practical or space-saving in some cases, in FIG. 2 one choke valve 20.

Further, a muffler 21 is connected to the outlet of the blow-off channel 16 or, thus, to the blow-off opening 17. It may also be integrated into the valve block 12.

In addition, the valve block 12 is further provided with a control 22 or control unit for controlling the 3/2 valves 13a and with a dew point sensor 23, both of which can also be integrated into the valve block 12.

The dew point sensor 23 may also be a humidity sensor, pressure sensor, and/or temperature sensor. When the device 1 is not a dryer 1 but a gas separation device, it may also be a sensor of gas quality with respect to oxygen, carbon dioxide, or volatile organic compounds.

Moreover, it is not ruled out that the valve block 12 is further provided with cooling fins or the like.

The operation of the dryer 1 is very simple and as follows.

During the operation of the dryer 1, gas to be dried, for example compressed gas from a compressor, is supplied through the inlet 2 and conveyed to the control valves 13 through the supply channel 14.

Through the control valves 13, it is conveyed to the vessel 4a which dries gas. In the case of FIGS. 1 and 2, this is the left-hand vessel 4a.

The gas will pass through the drying agent 5 and be dried, after which it will exit the dryer 1 by reversal along the bulkhead 11 through the access 10a and then through the outlet channel 15.

The regeneration channel 18 will branch off a portion of the dried gas as regeneration gas and bring it to the control valves 13, after which this regeneration gas will enter the vessel 4b being regenerated. In the case of FIGS. 1 and 2, this is the right-hand vessel 4b.

After passing through this vessel 4b, whereby the gas must again reverse through the bulkhead 11 and is thus, as it were, forced to pass through the drying agent, the gas will exit the dryer 1 through the blow-off channel 16 and the silencer 21.

When the drying agent in the left-hand vessel 4a is completely saturated, the two control valves 13 will switch, as is known, and the function of the vessels 4a, 4b will also be switched.

To this end, control 22 or controller will appropriately control the control valves 13 based, among other things, on the measurements of the dew point sensor 23.

The controller or control 22 of the valve system 6 will switch the vessels 4a, 4b, in the case of a small dryer 1, between drying and regeneration every ten to thirty seconds. It is also possible that the switchover occurs after a few minutes.

The exact changeover time depends on dryer 1 to dryer 1 and on the ambient conditions and the amount of active drying agent.

The left-hand vessel 4a will be regenerated after switching, while the right-hand vessel 4b will dry, whereby the entire method as described above repeats itself.

Working with two vessels 4a, 4b will ensure a continuous flow of dried gas.

As shown in FIGS. 1 and 2, during operation of the dryer 1 in this case, and preferably, the valve block 12 is located underneath vessels 4a, 4b.

This has the advantage that any condensate that may occur can easily drain through the blow-off channel 16.

It should be understood that the aforementioned blow-off channel 16 is optional.

Figure 3:
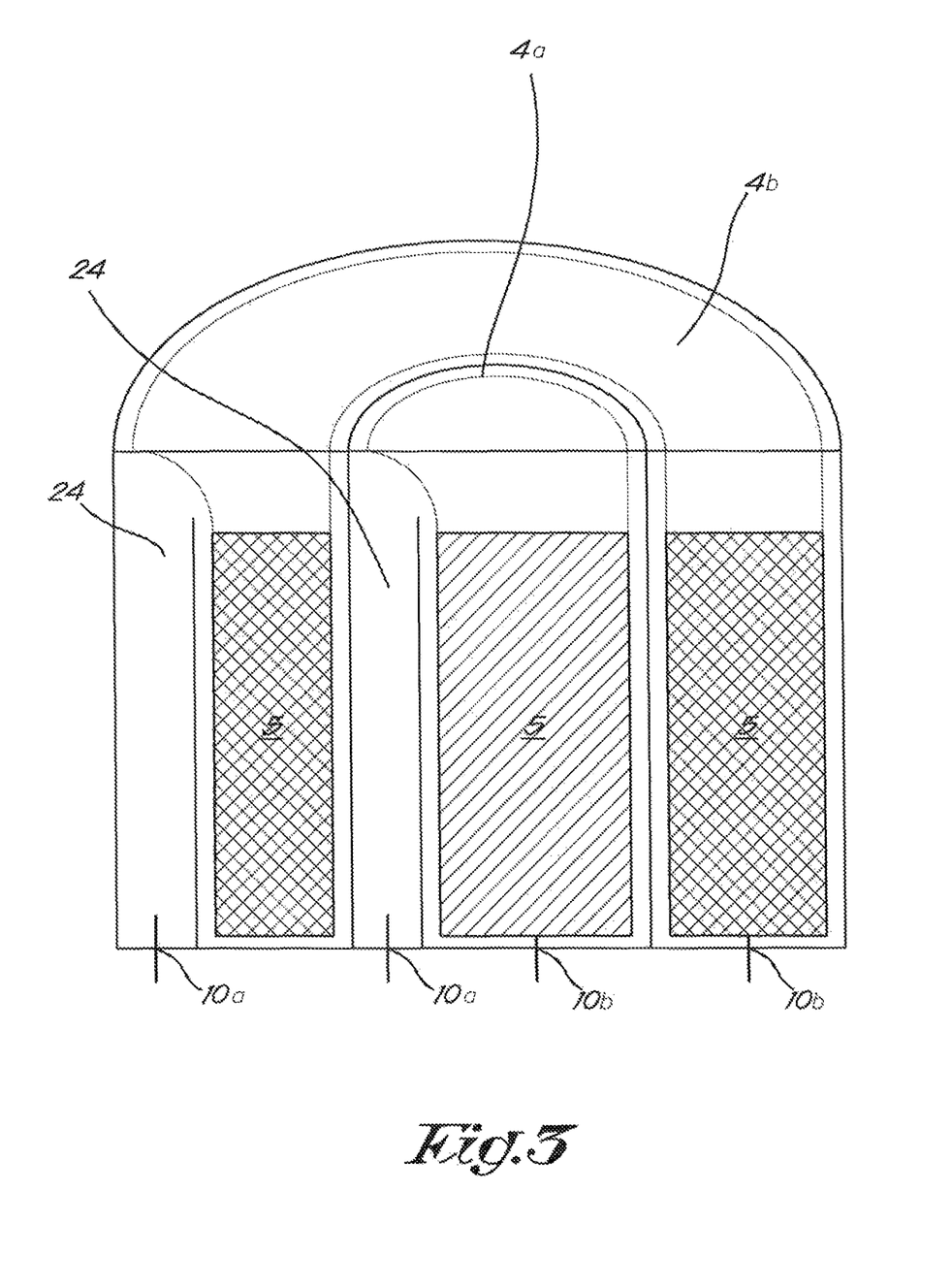
FIG. 3 shows another alternative embodiment of FIG. 1.
Figure 4:
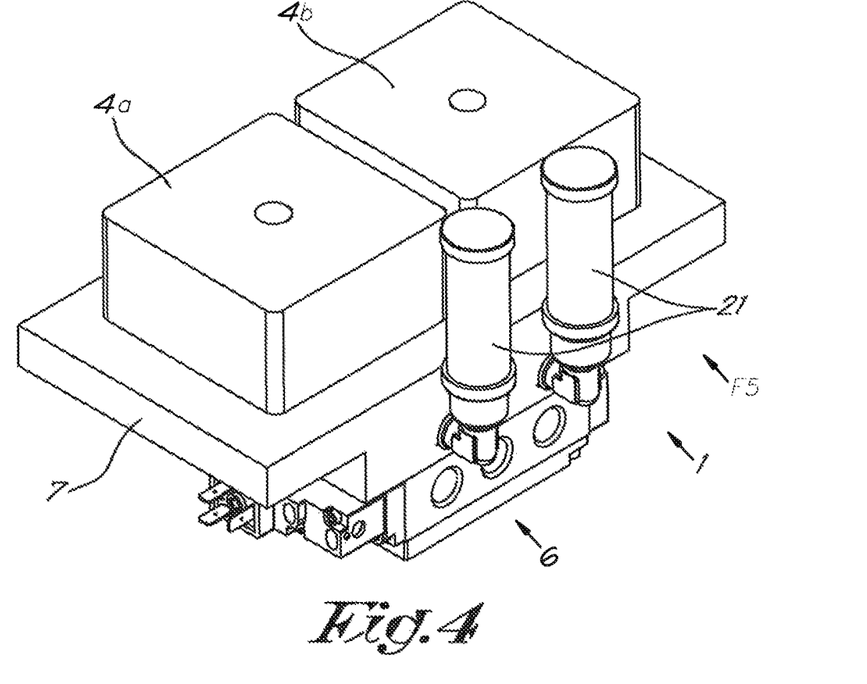
FIGS. 4 to 8 show a practical embodiment of the device in FIG. 1.
Figure 5:
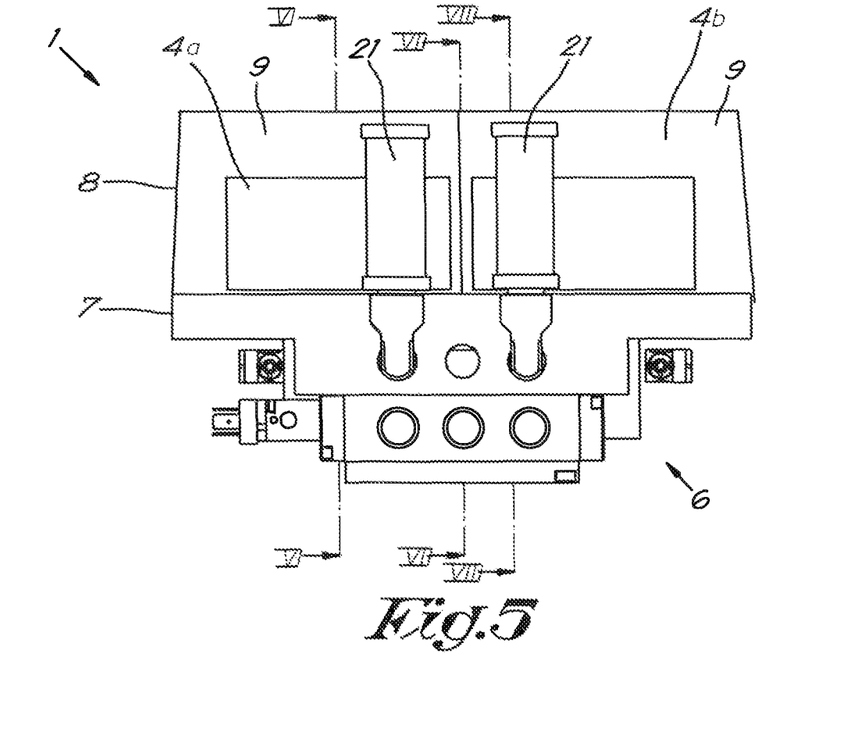
Figure 6:
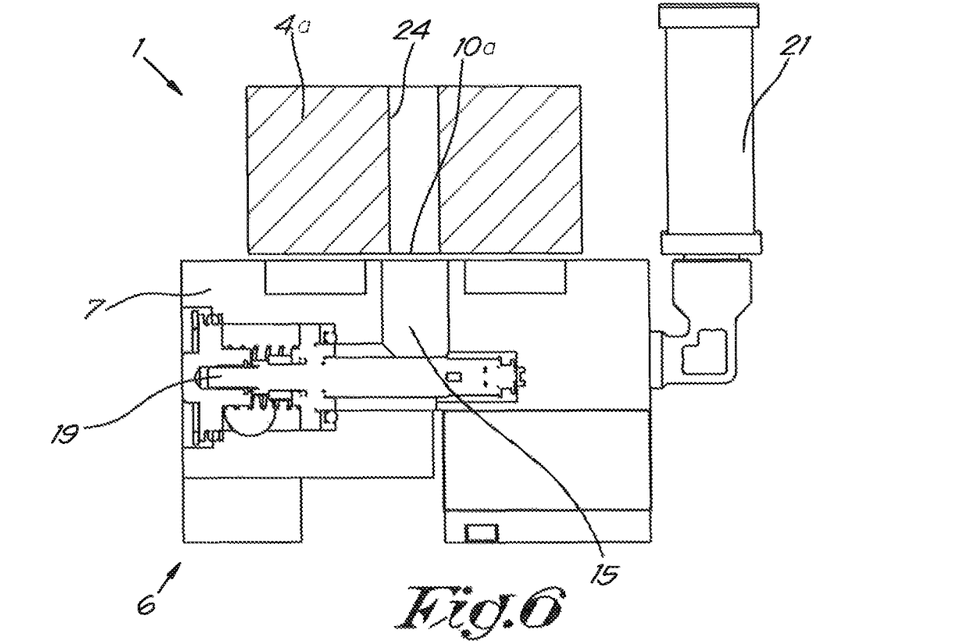
Figure 7:
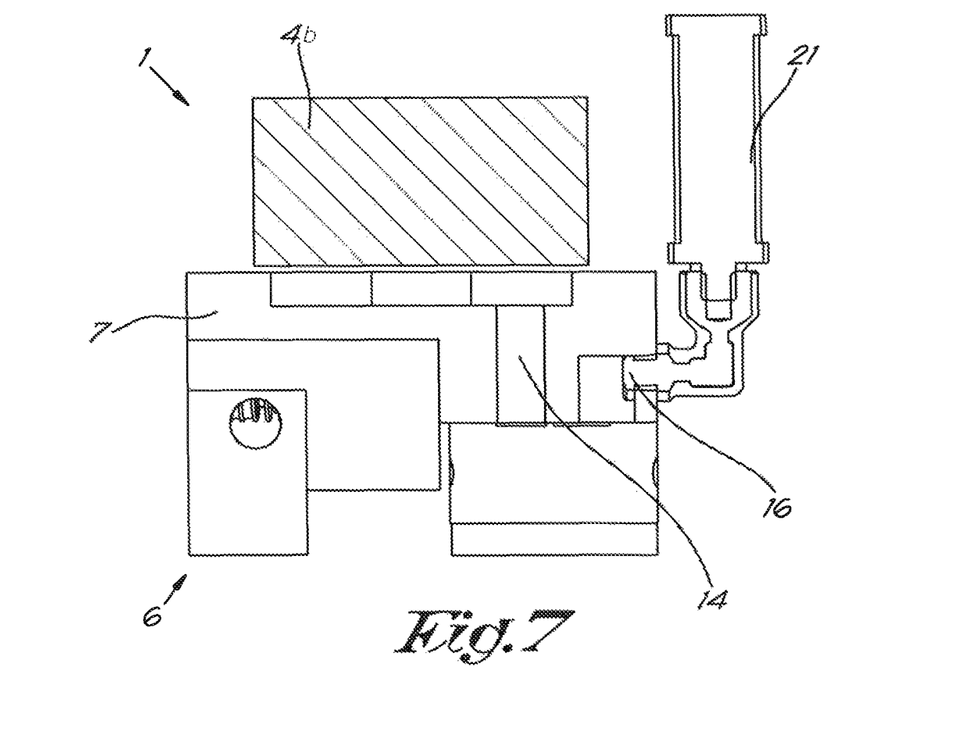
Figure 8:
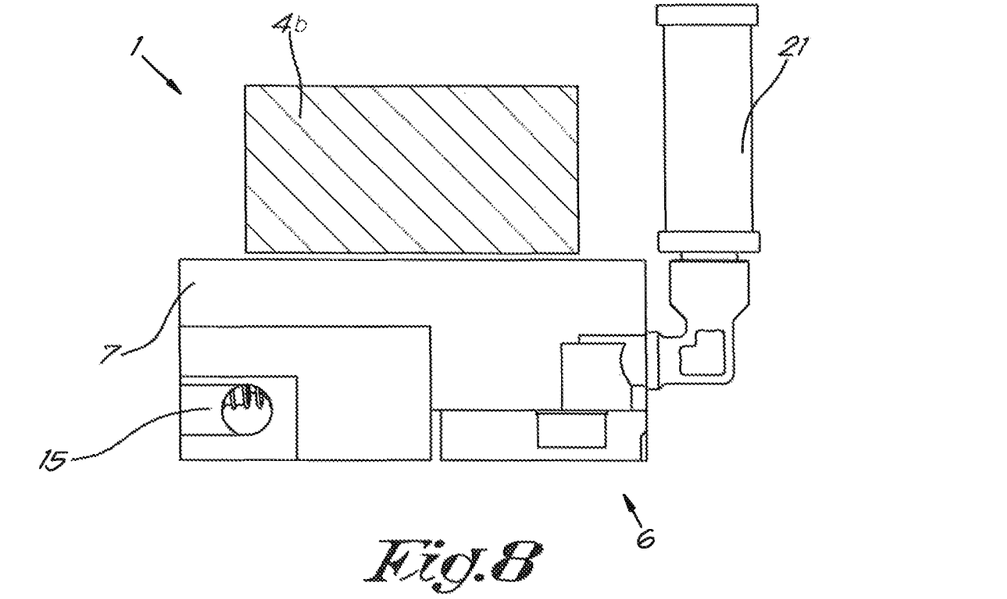
Figure 9:
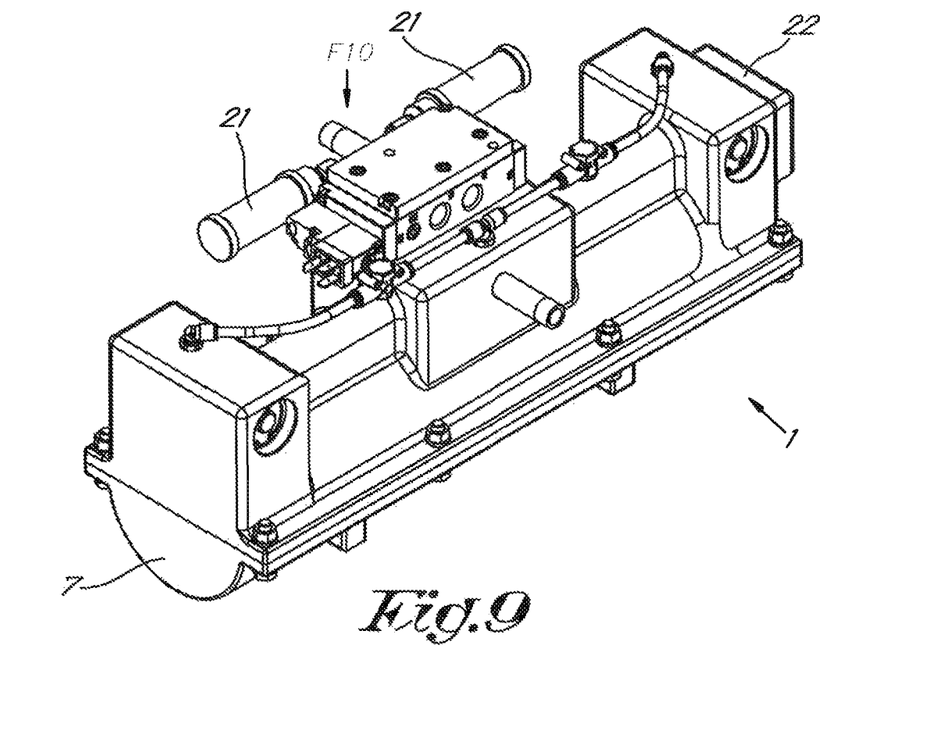
FIGS. 9 to 12 show a different practical embodiment of the device in FIG. 1.
Figure 10:
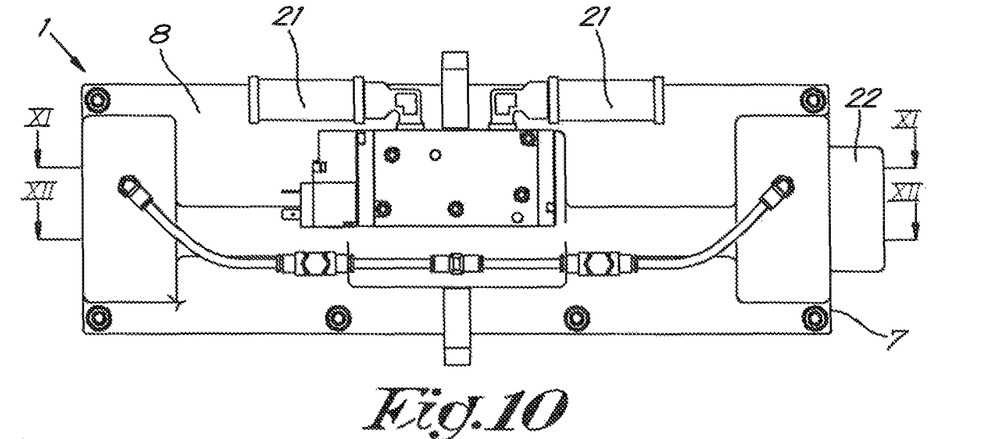
Figure 11:
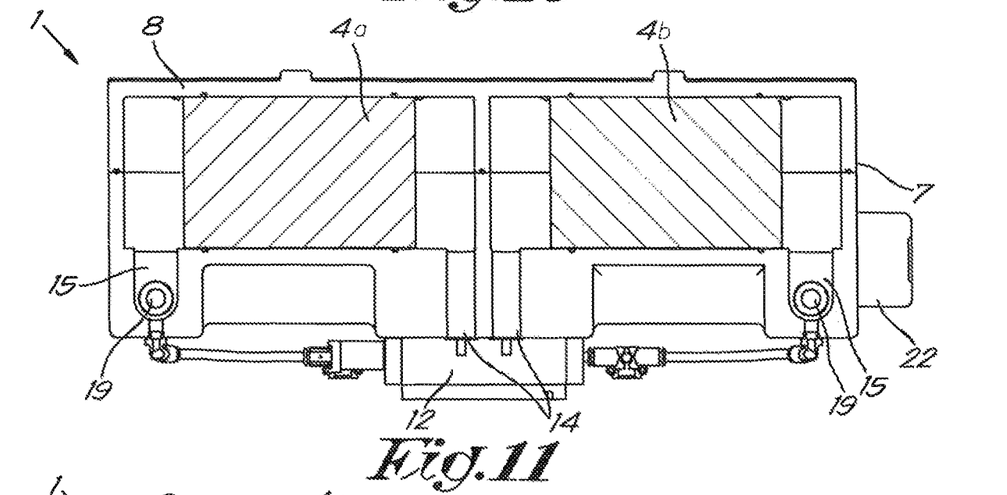
Figure 12:
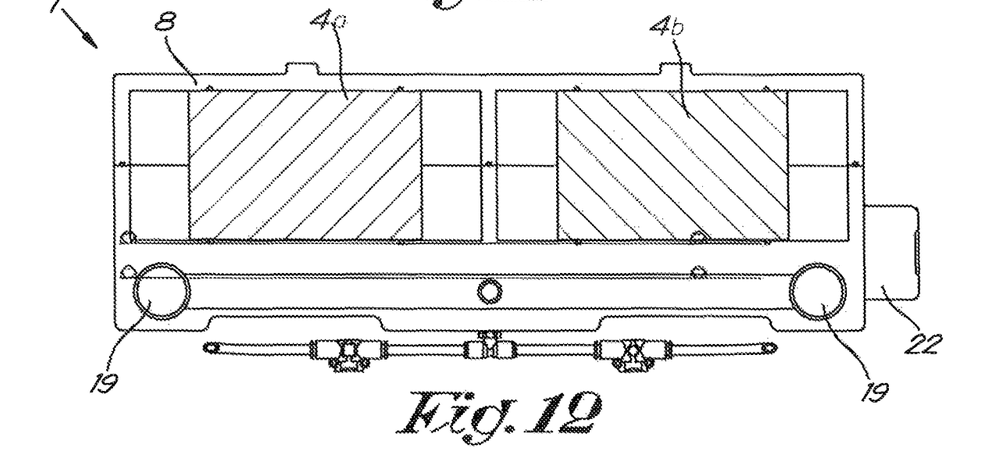

FIG. 3 shows a variant of the vessels of FIGS. 1 and 2, whereby in this case the one vessel 4a is executed as a cylinder and the other vessel 4b is executed as a hollow cylinder which is coaxially placed around the aforementioned one vessel 4a.

Solid arrangement is space-saving.

Also, the bulkheads 11 are replaced by connecting to one of the aforementioned passages 10a a conduit 24, tube, or the like extending into the vessel 4a, 4b and through the drying agent 5.

By such conduit 24, tube or the like, the gas entering the vessel 4a, 4b through the one access 10a will only be able to exit the vessel 4a, 4b through the other access 10b after passing through the drying agent 5.

Moreover, it cannot be ruled out that the conduit 24, tube or the like also contains drying agent 5.

FIGS. 4 to 8 show some views and cross-sections of a practical embodiment of a dryer 1 according to the invention, with indication of the relevant components and channels.

In this case, the drying agent 5 is block or beam-shaped. However, the shape of the drying agent 5 is not limiting for this design.

Also, one of the passages 10a of the vessels 4a, 4b containing drying agent 5 is located centrally under the vessels 4a, 4b. Connected to this is a conduit 24, tube, or the like, which thus runs centrally through the drying agent 5.

FIGS. 9 to 12 show another practical embodiment, in this case the drying agent 5 takes the form of a cylinder.

Note that in this embodiment, unlike in FIGS. 4 to 8, the valve block 12 is located above the drying agent 5. However, if a solid drying agent 5 is used or if granules of drying agent 5 are fixed in sieves or grilles, the orientation of the dryer 1 is not a factor.

Although the examples described and shown above each involve only two vessels 4a, 4b, it is not ruled out that there are more than three vessels 4a, 4b, whereby these vessels 4a, 4b are stacked on top of each other two by two.

The vessels 4a, 4b can then be connected in series two by two. Alternatively, the cycle of each vessel 4a, 4b may have been shifted over time and a control valve 13 and a check valve 19 may have been provided for each vessel 4a, 4b.

The present invention is by no means limited to the embodiments described as examples and shown in the figures, but a device and method for adsorbing a gas from a gas mixture to be treated according to the invention can be implemented in all shapes and sizes without going beyond the scope of the invention.

The invention claimed is:

1. A device for adsorbing a gas from a gas mixture to be treated, having an inlet for gas to be treated and an outlet for treated gas, which device comprises at least two vessels filled with a regenerable adsorbent and an adjustable valve system connecting said inlet and outlet to said vessels, whereby the adjustable valve system is such that at least one vessel will treat compressed gas while the other vessel is regenerated, whereby by control of the valve system the vessels each in turn treat compressed gas sequentially, wherein the adjustable valve system is assembled in a single valve block; in that the valve block is provided with: at least one control valve; a supply channel running from the inlet to the at least one control valve; a blow-off channel leading from the at least one control valve to a blow-off opening.

2. A device according to claim 1, wherein each vessel is provided with two accesses for gas, which are located next to each other or at the same end of each vessel and which are arranged in such a way that gas which enters each vessel through one access can only leave each vessel through the other access after passing through the adsorbent.

3. A device according to claim 2, wherein one of the accesses of each vessel is connected to a conduit or tube, which extends into each vessel and through the adsorbent.

4. The device according to claim 3, wherein the adsorbent is present in the conduit or tube.

5. The device according to claim 1, wherein the valve block is provided with:
an outlet channel running from the vessels to the outlet;
a regeneration channel running from the outlet channel to the vessels.

6. The device according to claim 5, wherein the outlet channel is provided with a check valve.

7. The device according to claim 5, wherein the at least one control valve includes either two 3/2 valves or one 5/2 valve.

8. The device according to claim 1, wherein a muffler is connected to the blow-off opening.

9. The device according to claim 1, wherein the at least one vessel includes a first cylindrical vessel and a second hollow cylindrical vessel which is coaxially placed around the first cylindrical vessel.

10. The device according to claim 1, wherein the adsorbent has a solid form, whereby it comprises a solid support made of ceramic material, paper, fiberglass, or wire mesh.

11. The device according to claim 1, wherein the adsorbent is in the form of granules held together in sieves or grilles.

12. The device according to claim 1, wherein the valve block is further provided with:
a dew point sensor; and/or
cooling fins; and/or
a control unit.

13. The device according to claim 1, wherein the device is provided with three vessels.

14. The device according to claim 1, wherein the control of the valve system is such that the vessels are switched between adsorbing and regenerating every ten to thirty seconds.

15. The device according to claim 1, wherein during operation of the device, the valve block is located under the vessels.

16. The device according to claim 1, wherein the other vessel being regenerated is subsequently cooled.

17. A method for adsorbing a gas from a gas mixture to be treated, using a device having an inlet for gas to be treated and an outlet for treated gas, the device comprising at least two vessels filled with a regenerable adsorbent, the method comprising using an adjustable valve system connecting the said inlet and outlet to the said vessels, whereby the method comprises
controlling the adjustable valve system such that at least one vessel will treat compressed gas, while the other vessel is regenerated, the vessels each in turn treating compressed gas sequentially, and
bringing the adjustable valve system together in a single valve block which is provided with:
at least one control valve;
a supply channel running from the inlet to the at least one control valve;
a blow-off channel leading from the at least one control valve to a blow-off opening.

18. The method according to claim 17, wherein the method comprises the following steps:
providing each vessel with two accesses located adjacent to each other or at the same end of each vessel, and
passing the gas through the vessels in such a way that the gas enters each vessel through one access,
wherein only after passing through the adsorbent can the gas leave each vessel through the other access.

19. The method according to claim 18, wherein the method comprises the step of
connecting a conduit or tube to one of the accesses of each vessel, said accesses extending into each vessel and through the drying agent.

20. The method according to claim 17, wherein the method includes the step of
switching the vessels every ten to thirty seconds between adsorbing and regenerating.

* * * * *